May 21, 1963 R. A. FLOWER 3,090,950
LOW ALTITUDE DOPPLER SYSTEM
Filed Aug. 19, 1960 2 Sheets-Sheet 2

INVENTOR.
ROBERT A. FLOWER
BY H. A. Mackey
ATTORNEY.

United States Patent Office 3,090,950
Patented May 21, 1963

3,090,950
LOW ALTITUDE DOPPLER SYSTEM
Robert A. Flower, White Plains, N.Y., assignor to General Precision, Inc., a corporation of Delaware
Filed Aug. 19, 1960, Ser. No. 50,774
9 Claims. (Cl. 343—8)

This invention relates to aircraft Doppler navigational systems employing beams of microwave radiation. The invention particularly relates to improvements in pulsed Doppler systems and others, including frequency-modulated continuous-wave systems, enabling them to operate accurately at low altitudes.

In one form of self-contained navigational system the transmitted signals consist of a pulse train of microwave radiation, so that microwave echoes can be received during pulse spaces without interference from the transmitter, the same antenna being used for both transmission and reception. In order to prevent injury to the receiver, or its paralysis, by leakage from the transmitter the receiver is gated off during each pulse transmission period.

For a number of reasons the receiver does not regain its full sensitivity immediately after the end of a transmitter pulse, but requires at least a fraction of a microsecond, usually one-half microsecond or more to recover. Since in one-half microsecond a microwave beam travels about 163 yards, pulsed Doppler systems do not operate satisfactorily below a slant range of about 250 feet.

One form of pulsed Doppler system emits two oblique beams of pulsed radiation toward the earth, one slanted forward and the other slanted aft at an equal angle. The echoes radiated from the earth are received and intermodulated to form a microwave signal containing the sum of the two Doppler frequency differences experienced by the two beams. This signal is amplified and demodulated to secure a signal having a broad spectrum, usually in the range of 2,000 to 30,000 cycles per second, with a central frequency equalling that of the Doppler sum. This signal is tracked, since its frequency is usually changing, and its central frequency is determined in a component termed a frequency tracker. The output signal of this component is proportional to aircraft speed.

The equipment generally requires the use of more than two microwave beams, at least two of the beams straddling the aircraft ground track. The equipment then performs the added function of comparing the frequencies of the straddling beams and, through an azimuth servomechanism, rotating the antenna structure in azimuth until the beams exactly straddle the ground track. A dial on the servomechanism indicates the angle between aircraft heading and ground track, termed the drift angle.

These tracking and computing components are further described in the Institute of Radio Engineers Transactions, volume ANE-4, December 1957, pages 202–211 inclusive and in U.S. Patent No. 2,915,748.

When an aircraft equipped with such a system descends for a landing, at about 200 feet above the ground the calibration constant, or ratio between Doppler frequency difference and ground speed, begins to vary greatly, causing error in the speed indication. Finally, the signal is lost completely. Thus the pilot is not given the desired information down to the instant of touchdown on the runway.

The present invention provides a Doppler radar system which operates reliably at any altitude down to ground level, and even during taxiing on the runway. It provides simple, automatic components to be added to existing systems to eliminate all false indications and lack of speed and drift information at altitudes below 500 feet and to give true indications based on strong Doppler signals. At altitudes above 500 feet, the system returns to its normal operating mode.

The invention provides an additional radar receiver, with its own antenna, for the sole purpose of receiving signals below 500-feet altitude. The antenna has over 100-db isolation from the navigational system antenna, therefore is not materially interfered with by leakage from the transmitter. Means are provided for automatically substituting the additional receiver for the system receiver when descending below 500 feet, and for automatically returning to the system receiver when ascending above 500 feet.

The purpose of this invention is to provide equipment for extending reliable operation of Doppler navigational radar systems to low altitudes.

A further understanding of this invention may be secured from the detailed description and associated drawings, in which.

Figure 1:
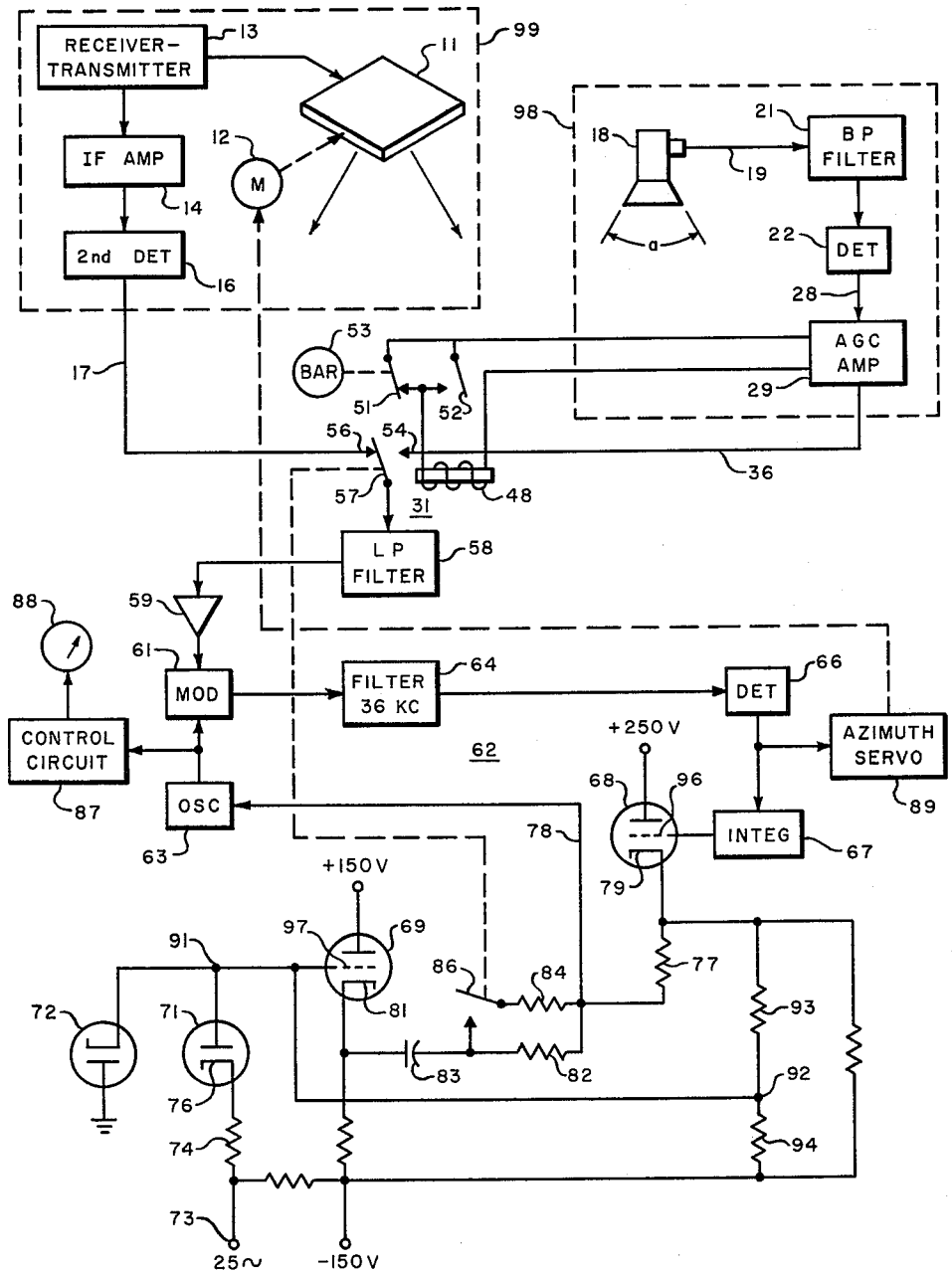
FIGURE 1 is a schematic diagram of an embodiment of the invention.

Referring now to FIGURE 1, a planar microwave antenna 11 installed on an aircraft emits four beams of radiation toward the earth in timed sequence. The antenna is horizontally stabilized, by means not shown, and may be moved in azimuth by a motor 12.

This motor is part of a servomechanism which positions the antenna beams to straddle the ground track of the aircraft. A receiver-transmitter, 13, generates microwave energy at 8800 mc. p.s., pulsed at, for example, 150 kc. p.s. with a 25 percent duty cycle. This energy is applied to the antenna 11. The receiver is biased by signals from the transmitter pulse generator so that it is disabled during the transmitter pulses and for one-half microsecond following each pulse. The received signals are demodulated by the receiver to a carrier frequency of 30 mc. p.s. and applied to an intermediate frequency amplifier 14. The amplified output is again demodulated in a second detector 16, emitting in conductor 17 a broad-spectrum signal having a central frequency in the range between 2,000 and 30,000 cycles per second, this frequency depending on and proportional to the aircraft ground speed.

These components and their operation are more fully described in the references, supra, and constitute part of a representative Doppler navigational system.

A microwave horn receiving antenna 18 consists of a rectangular hollow waveguide flared at one end to form a space radiator and provided at the other end with a transition to coaxial cable. This antenna is designed for operation at 8800 mc. p.s. and has a beamwidth of 90°. Its beam cross section is circular, but can alternatively have some other form, such as that of a four-leaf clover, to improve signal-to-noise ratio. The antenna signal is applied through a coaxial conductor 19 to a microwave filter 21 designed to transmit a band between 8750 and 8850 mc. p.s. The filter output is transmitted to a crystal detector 22.

Figure 2:
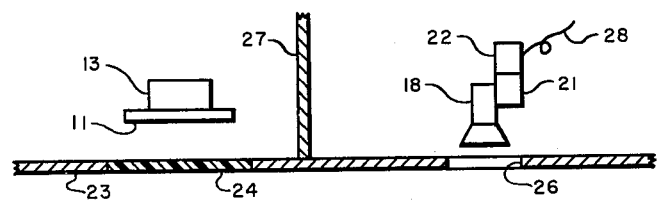
FIGURE 2 shows the antennas of the invention mounted in an aircraft.

These components are positioned in the aircraft relative to the planar antenna as shown in FIGURE 2. The metal bottom skin, 23, of the aircraft contains window, 24, closed by a plastic sheet transparent to microwave radiation. The planar antenna 11 together with its receiver-transmitter 13 is positioned above this window within the aircraft. The horn antenna 18 is positioned above another aperture 26 in the aircraft skin at a distance of at least several feet from the planar antenna. In order to secure the necessary isolation of the horn antenna from the radiation transmitted by the planar antenna the horn antenna should be separated from the plane of the outer skin surface by at least a fraction of an inch. If the aperture 26 is closed by a plastic sheet its thickness should be small. The two antennas should be completely shielded internally, as schematically indicated by the conductive partition 27. The horn antenna 18, microwave filter 21, and crystal demodulator 22 may be joined as a single compact structure as shown.

The output from detector 22 imposed on conductor 28, at Doppler frequencies, is applied to an audio amplifier 29, FIGURE 1, designed to transmit the frequency range of 2,000 to 30,000 c.p.s. This amplifier is provided with an automatic gain control component which also provides a direct potential, proportional to signal amplitude, to operate a relay 31.

Figure 3:
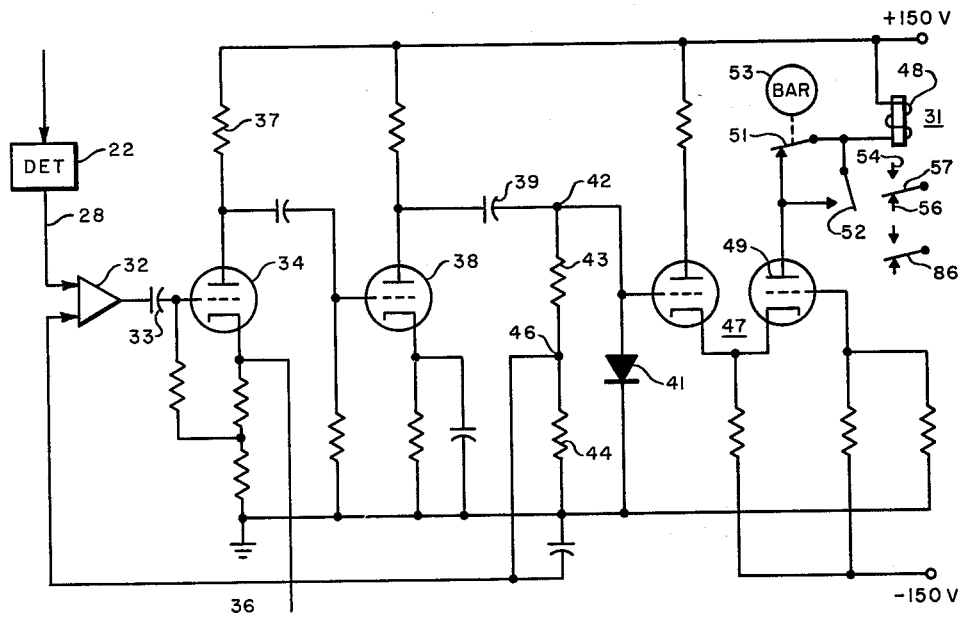
FIGURE 3 is a schematic diagram of the automatic-gain-controlled amplifier and the electromagnetic relay used in the circuit of the invention.

The circuit of this amplifier is shown in more detail in FIGURE 3. The detector 22 output is applied to a gain-controlled amplifier 32, the output of which is coupled by a capacitor 33 to a cathode follower 34 having its output at conductor 36. A plate load resistor 37 is inserted in the cathode follower power supply and a second output is taken from its plate to another stage 38. The output thereof is coupled through a capacitor 39 to a rectifying diode 41 and ground. The voltage of between −20 and −30 volts available at terminal 42 is reduced by a voltage divider $43/44$ to about −4 to −6 volts at terminal 46, from which the voltage is fed back to control the gain of the amplifier 32. This gain control results in considerable dynamic signal compression. The voltage available at terminal 42 is also applied through a direct-coupled differential amplifier 47 to the operating coil 48 of relay 31. The circuit connection from a plate 49 of the differential amplifier 47 to the relay coil 48 is made through two switches, 51 and 52, in parallel. Switch 51 is normally closed and is connected to be opened above 6,000 feet altitude by a barometric altimeter pressure element 53. The switch 52 is manually operated.

The output of the gain control amplifier impressed on conductor 36, FIGURE 1, is applied to a normally-open contact 54 of relay 31. The output of the second detector 16 on conductor 17 is applied to the conjugate normally-closed contact 56. The contact arm 57 is connected to a low-pass filter 58 transmitting frequencies below 31,000 c.p.s. The filter output is amplified by an amplifier 59 and applied to a modulator 61 which is the first element in a frequency tracker loop 62. The modulator 61 is modulated by an oscillator 63 having an average frequency of 36 kc. p.s. plus the Doppler frequency. The modulator output therefore contains, at balance, a 36-kc. p.s. signal. This is filtered in a 36-kc. p.s. bandpass filter 64, detected at 66 and integrated by integrator 67. The direct-current output is mixed with 25 c.p.s. alternating current in a proportioning circuit comprising triodes 68 and 69, and diodes 71 and 72. The 25 c.p.s. supply is applied from a supply terminal 73 through a resistor 74 to the cathode 76 of diode 71. Output is taken from one end of a cathode resistor 77 through conductor 78 to the input of oscillator 63. This input controls the oscillator frequency in such direction as to tend to center the input to filter 64 in its pass band. Thus the input connection to the oscillator 63 closes the frequency tracker loop.

The cathodes 79 and 81 of triodes 68 and 69 are connected through resistors 77 and 82, and a capacitor 83. A resistor, 84, can be paralleled across resistor 82 by a normally-open contact arm, 86, of the relay 31.

The output of oscillator 63 is additionally applied, through a control circuit 87, to a dial 88 indicating oscillator frequency and directly calibrated in proportional aircraft speed.

The output of detector 66 is additionally applied to an azimuth servomechanism 89 including motor 12.

The proportioning circuit operates as follows. When the 25 c.p.s. input at terminal 73 is negative, both diodes 71 and 72 conduct and their junction 91 is placed at ground potential. This ground potential is thus applied to the connected junction 92 of resistors 93 and 94, and the potential thereby applied to control oscillator 63 through conductor 78 has a selected value depending upon the network design and upon the integrator output 96 applied to the grid 96. However, when the 25 c.p.s. input supply changes to positive, the diodes 71 and 72 become nonconductive and the potential of junction 91 and of grid 97 increases. Thus, positive potential is applied through capacitor 83 and resistor 82 to the oscillator input conductor 78, and is added to the direct potential already thereon. Thus, to the direct current applied to the oscillator is added 25 c.p.s. potential having a peak-to-peak value proportional to the integrator output potential. When the switch 86 is open the alternating potential bears such relation to the direct potential that the frequency modulation of the oscillator is ±6 percent, or has a frequency excursion of 6 percent of its frequency throughout its frequency range. When the switch 86 is closed the excursion is 7½ percent.

The low altitude receiver enclosed by the dashed line 98 has low sensitivity so that it is unaffected by most forms of interference. However, it is wideband and also has a very wide beam angle, so that even though insensitive, it is subject to interference, for example, from other radar-equipped aircraft, that may inadvertently operate the relay 31. To reduce this possibility, the barometric switch 51 is provided as shown in FIGURE 3 and described. The barometric switch is set to open the coil circuit at altitudes above 6,000 feet referred to sea level. The manual switch 52 permits the pilot to override the barometric switch.

In the operation of the circuit of FIGURE 1, the receiver-transmitter 13 and antenna 11 emit two beams simultaneously, one forward and to the right of the ground track and the other aft and to the left. At regular intervals these beams are replaced by two other simultaneous beams, one forward and to the left and the other aft to the right. The angle each beam makes with the horizontal velocity direction is 68.4°, so that the angle between two beams simultaneously emitted is about 50°. The angle, $a$, of the conical beam of the horn antenna is enough greater than this angle so that substantially all of the energy of the ground echoes from both of the two beams 50° apart is received by the horn antenna 18. The frequencies of these two echoes will be, respectively, greater and less than the transmitted microwave frequency by the amount of the Doppler frequency change undergone by each beam radiation. Thus, when the echo energy in the horn antenna 18 containing these two different frequencies is detected at detector 22, intermodulation within this detector causes the double Doppler frequency change to appear as a signal having a frequency in the range 2,000 to 30,000 c.p.s. This signal appears at conductor 36.

However, at altitudes above 500 feet the signal is so weak that the resulting voltage at junction 42, FIGURE 3, is unable to operate the relay 31, which remains unoperated with its arm 57 against contact 56 and arm 86 open. Therefore the output of the second detector 16 in conductor 17 is applied to the low pass filter 58, and the navigational Doppler radar, including the components 99 and the frequency tracker 62, operates normally.

The relay 31 is made to close at a lower altitude upon descent than it is made to open upon ascent, by virtue of the difference between its "operate" current and its "release" current. This avoids "hunting" between the two modes of operation, which might otherwise occur during nearly level flight over rolling terrain at the critical switching altitude.

When the aircraft descends, at about 300 feet above the earth the signal rectified by detector 22 and amplified by amplifier 29 becomes strong enough to operate the relay coil 48. The frequency tracker is thereby connected to operate from the low-altitude receiver 98 instead of from the normal system receiver in the receiver-transmitter 13. Since the low-altitude receiver 98 is not gated, it is not prevented from operating at any time, even during the transmitting pulse. Because of the 100-db isolation achieved between the two antennas, the leakage of transmitter energy into the detector 22 is of the order of $10^{-10}$ of the total transmitter energy. This leakage is easily overridden, at altitudes below 500 feet, by the strong echo signal received by the horn antenna from the ground.

The frequency spectrum of the signal received by the horn antenna is very wide, because of its wide angle, and the corresponding Doppler spectrum is also widened relative to the normal system spectrum. In order to improve frequency tracker error sensing operation it is desirable to increase the excursions of the frequency modulation of the oscillator 63. This is effected by the contact arm 86, which places the resistor 84 in shunt with resistor 82 when operating from the low-altitude receiver 98, thus increasing the frequency modulation of the oscillator 63 from the normal excursion of ±6% to a low-altitude excursion of +7½%.

What is claimed is:

1. A Doppler radar system comprising, an aircraft microwave transmitter-receiver-antenna emitting energy beamed at a target and receiving Doppler information, tracking and conversion means for converting Doppler information into navigational data, a second antenna and receiver positioned for receiving only the echoes of said energy from said target and emitting Doppler information, and switch means operated by the output signal of said second antenna and receiver, said switch means when unoperated connecting said transmitter-receiver-antenna to said tracking and conversion means and when operated connecting said second antenna and receiver to said tracking and conversion means.

2. A Doppler radar system for indicating aircraft speed comprising, means including a first antenna for simultaneously transmitting a pair of divergent beams of electromagnetic energy against a target, first receiving means including said first antenna for receiving energy reflected from said target, second receiving means including a second antenna for receiving only the reflected components of said pair of divergent beams of energy concurrently with said transmission, translating means for translating said received energy into an indication of the speed of said aircraft, a relay connecting said first receiving means to said translating means when unoperated and when operated connecting said second receiving means to said translating means and means for operating said relay by signal energy produced by said second receiving means.

3. A Doppler radar system for indicating aircraft speed comprising, means including a first antenna for simultaneously transmitting a pair of divergent beams of electromagnetic energy toward the earth, first receiving means including said first antenna for receiving energy reflected from the earth's surface, second receiving means including a second antenna for simultaneously receiving only the reflected components of said pair of divergent beams of energy concurrently with the said transmission and emitting a signal having an amplitude representative of the amplitudes of said reflected components, translating means for translating said received energy into an indication of the speed of said aircraft, a relay having a selected value of operating current, said relay connecting said first receiving means to said translating means when unoperated and when operated connecting said second receiving means to said translating means, and means operating said relay by signal energy produced by said second receiving means when said signal amplitude equals said selected value of operating current.

4. A Doppler radar system for indicating aircraft ground speed and drift angle at all altitudes including low altitudes comprising, means including a first antenna for transmitting a plurality of divergent beams of microwave energy toward the earth's surface, first receiving means including said first antenna for receiving energy reflected from the earth's surface and emitting a Doppler intelligence signal, second receiving means including a second antenna having selected isolation from said first antenna for receiving only energy reflected from the earth's surface and emitting a Doppler intelligence signal, the magnitude of said Doppler intelligence signal being inversely proportional to aircraft altitude, translating means for translating Doppler intelligence signals into indications of the ground speed and drift angle of said aircraft, a relay having a selected value of operating current, said relay when unoperated connecting said first receiving means to said translating means and when operated connecting said second receiving means to said translating means, and means for operating said relay by signal energy produced by said second receiving means from said Doppler intelligence signals, the magnitude of said signal energy exceeding said selected value of operating current at aircraft altitudes below a selected limit.

5. A pulsed Doppler radar system for indicating aircraft ground speed at altitudes including low altitudes comprising, airborne means including a first antenna transmitting pulsed microwave energy in a plurality of divergent beams toward the earth, first receiving means including said first antenna for receiving echo signals reflected from the earth and emitting a Doppler intelligence signal, said first receiving means including gating means for rendering it inoperative during each transmitted pulse, second receiving means including a second antenna isolated from said first antenna for receiving only energy of said beams reflected from the earth and emitting a Doppler intelligence signal having a magnitude inversely proportional to aircraft altitude, said second receiving means being ungated, translating means including a frequency tracker for translating Doppler intelligence signals into indications of the ground speed of said aircraft, a relay having a selected value of operating current, said relay when unoperated connecting said first receiving means to said translating means and when operated connecting said second receiving means to said translating means, and connection means operating said relay by an output of second receiving means when the magnitude of the Doppler intelligence signal impressed thereon rises above a selected value.

6. A Doppler radar system comprising, an aircraft transmitter-receiver-antenna emitting energy beamed at a target and receiving Doppler information therefrom, conversion means connected thereto for converting said Doppler information into navigational data, a low-altitude antenna-receiver positioned for receiving only the echoes of said energy from said target including Doppler information and emitting a signal, switch means operated by said signal to transfer said conversion means from said transmitter-receiver-antenna to said antenna-receiver, and barometric pressure-sensitive means for disabling said switch means when barometric pressure is below a selected value.

7. A Doppler radar system comprising, an aircraft transmitter-receiver-antenna emitting energy beamed at a target and receiving Doppler information therefrom, conversion means connected thereto for converting said Doppler information into navigational data, a low-altitude antenna-receiver positioned for receiving only the echoes of said energy from said target including Doppler information, said antenna-receiver emitting a second signal representative of the amplitude of said received echoes, switch means operated by said second signal at a selected amplitude to transfer said conversion means from said transmitter-receiver-antenna to said antenna-receiver for excitation by said first signal, and barometric pressure-sensitive means for preventing operation of said switch means by said second signal when ambient barometric pressure is below a selected value.

8. A Doppler radar system comprising, an aircraft transmitter-receiver-antenna emitting energy beamed at a target and receiving an echo containing Doppler information therefrom, tracking and conversion means connected thereto for converting said Doppler information into navigational data, said tracking and conversion means including an oscillator which is frequency modulated at a first selected excursion, a low-altitude antenna-receiver positioned for receiving only the echoes of said energy from said target including Doppler information and emitting a signal, and switch means operated by said signal to transfer said tracking and conversion means from said transmitter-receiver-antenna to said antenna-receiver and to change said frequency modulation from said first excursion to a second selected excursion value.

9. A Doppler radar system comprising, an aircraft transmitter-receiver-antenna emitting energy beamed at a target and receiving an echo containing Doppler information therefrom, tracking and conversion means connected thereto for converting said Doppler information into navigational data, an oscillator in said tracking and conversion means, a proportioning circuit in said tracking and conversion means frequency modulating said oscillator to attain a first selected excursion of frequency of said oscillator, a low-altitude antenna-receiver positioned for receiving only the echoes of said energy from said target including Doppler information, said antenna-receiver emitting a first signal containing said Doppler information and emitting a second signal having amplitude representative of the amplitudes of said received echoes, and a switch operated by said second signal at a selected amplitude thereof to transfer said tracking and conversion means from said transmitter-receiver-antenna to said antenna-receiver for excitation by said first signal, said switch also switching said proportioning circuit to attain a second selected value of frequency excursion of the oscillator.

No references cited.